(12) United States Patent
Stouffer et al.

(10) Patent No.: US 11,856,899 B2
(45) Date of Patent: Jan. 2, 2024

(54) MONITORING AND CONTROL OF A MOVABLE TOWER IN AN IRRIGATION SYSTEM

(71) Applicant: Reinke Manufacturing Co., Inc., Deshler, NE (US)

(72) Inventors: Monte Keith Stouffer, Fairmont, NE (US); Hal Reece Hockersmith, Deshler, NE (US)

(73) Assignee: Reinke Manufacturing Co., Inc., Deshler, NE (US)

( * ) Notice: Subject to any disclaimer, the term of this patent is extended or adjusted under 35 U.S.C. 154(b) by 892 days.

(21) Appl. No.: 16/446,964

(22) Filed: Jun. 20, 2019

(65) Prior Publication Data
US 2020/0396912 A1     Dec. 24, 2020

(51) Int. Cl.
*A01G 25/09*  (2006.01)
*A01G 25/16*  (2006.01)
*E04H 12/34*  (2006.01)

(52) U.S. Cl.
CPC ........... *A01G 25/092* (2013.01); *A01G 25/16* (2013.01); *E04H 12/344* (2013.01)

(58) Field of Classification Search
CPC ..... A01G 25/092; A01G 25/16; E04H 12/344
USPC ........................................................ 700/284
See application file for complete search history.

(56) References Cited

U.S. PATENT DOCUMENTS

| | | | |
|---|---|---|---|
| 5,493,499 A | 2/1996 | Theurer et al. | |
| 6,512,992 B1 | 1/2003 | Fowler et al. | |
| 6,654,796 B1 * | 11/2003 | Slater | H04L 41/0273 709/236 |
| 7,029,175 B2 | 4/2006 | Karaus et al. | |
| 7,356,046 B2 | 4/2008 | Harley, Jr. | |
| 10,905,499 B2 | 2/2021 | Rafii-Tari | |
| 11,061,144 B2 | 7/2021 | Thatcher | |
| 2001/0037670 A1 | 11/2001 | Boger et al. | |
| 2002/0066810 A1 | 6/2002 | Prandi | |
| 2013/0048747 A1 * | 2/2013 | Pfrenger | A01G 25/092 239/723 |
| 2013/0211717 A1 | 8/2013 | Abts | |

(Continued)

OTHER PUBLICATIONS

International Search Report and Written Opinion received for PCT Patent Application No. PCT/US2020/038658, dated Sep. 3, 2020, 32 pages.

(Continued)

*Primary Examiner* — Charles Cai
(74) *Attorney, Agent, or Firm* — Shook, Hardy & Bacon, LLP

(57) ABSTRACT

Aspects of the technology described herein provide a system for improved control and monitoring of a movable tower in an irrigation system. A computer controller associated with a tower of an irrigation system receives an indication of parameter modification. The system is then able to change parameters at a component of the tower control system based on the received parameters. The system stores the current angle sensed between two adjacent span members. If the stored angle is between two threshold levels, a drive signal is provided to a motor. The system is operable to selectively apply a drive signal at a tower in an align mode. The system provides the ability to digitally modify a threshold that is used in a machine run-mode to operate the motor at a tower.

20 Claims, 7 Drawing Sheets

(56) References Cited

U.S. PATENT DOCUMENTS

| | | | |
|---|---|---|---|
| 2014/0326808 A1* | 11/2014 | Malsam | B05B 12/12 |
| | | | 239/728 |
| 2015/0164007 A1* | 6/2015 | Schiltz | A01G 25/092 |
| | | | 700/284 |
| 2016/0037736 A1 | 2/2016 | Rainone et al. | |
| 2016/0309667 A1 | 10/2016 | Kreikemeier | |
| 2017/0332565 A1 | 11/2017 | Wolgast | |
| 2017/0349060 A1* | 12/2017 | Abts | A01G 25/092 |
| 2018/0164179 A1 | 6/2018 | Bagasra | |
| 2019/0349426 A1* | 11/2019 | Smith | H04L 63/123 |
| 2020/0120916 A1 | 4/2020 | Miller et al. | |
| 2020/0154655 A1 | 5/2020 | Dick et al. | |
| 2020/0305366 A1 | 10/2020 | Burkey et al. | |

OTHER PUBLICATIONS

Standard Center Pivot Operators Manual, Reinke Manufacturing Company, Inc., Deshler, Nebraska, USA. 69 pages. Last accessed Mar. 28, 2019. Available at: www.reinke.com.

Non-Final Office Action dated May 19, 2021 in U.S. Appl. No. 16/837,748, 26 pages.

International Preliminary Report on Patentability received for PCT Patent Application No. PCT/US2020/038658, dated Aug. 12, 2021, 11 pages.

Notice of Allowance dated Feb. 9, 2022 in U.S. Appl. No. 16/837,748, 13 pages.

\* cited by examiner

MONITORING AND CONTROL OF A MOVABLE TOWER IN AN IRRIGATION SYSTEM

TECHNICAL FIELD

This disclosure is related to electrical and electronic monitoring and control of movable towers in a span of an irrigation system.

BACKGROUND

An irrigation system is a system that provides delivery of fluid to irrigate an area of land with the fluid. The fluid may be water, where the purpose is to provide moisture, e.g. for crops. The fluid may be chemigation fluid, that is, water bearing chemicals to be applied through an irrigation system. The fluid may be fertigation fluid, that is, water bearing one or more fertilizers. The fluid may be insectigation fluid, that is, water bearing one or more insecticides.

There are several different types of irrigation systems. Two common types are center pivot irrigation systems and lateral move irrigation systems. The present invention may be employed in either system. The basic elements of a center pivot irrigation system are together called the "machine" and comprises a center pivot, a number (N) of towers that extend away from the pivot, a number (N) of spans that connect the pivot to the first tower and each subsequent tower to the adjacent tower, and a final boom that extends beyond the final tower. The center pivot serves as a source of fluid for the Machine and has a Main Control Point (MCP) with status indicators and control actuators. Electrical power and signals are carried to one or more towers along the machine in a "span cable" that typically runs from the center pivot to the final tower (tower N). Each span is mechanically coupled to provide a tube for fluid transport from the center pivot through each tower all the way to the end of the boom. Each span also serves as a structural element providing a number of sprinkler heads placed along each span and along the boom to provide a line of fluid irrigation. In a normal irrigation mode the entire machine is moved about the pivot, e.g. by controlling the speed of the final tower (tower N) which is then rotated about the pivot at a controlled speed. Each tower is fitted with wheels, typically two or more. Each wheel is mounted such that a side-plane of the wheel is largely perpendicular to a line formed in the direction of the pivot. Each tower has an electric motor mechanically coupled, e.g. through a driveshaft to a gear-box that drives at least one wheel in either the forward or reverse direction. The tower structure comprises a base that extends from the first to the second wheel, and typically has a motor mounted in the center of the base. A mechanical superstructure extends above the base of the tower to secure each span adjacent to the tower to one or more tower legs that extend upward above the base, and to provide one or more mounting locations above the span. The one or more legs may be additionally fitted with one or more cross members mounted to a span or to the legs of the tower.

Typically, misalignment of a tower causes a failure that stops operation of the entire machine, until the system state is (often manually) recovered. Misalignment might be caused for example, when one of the wheels of the tower lags, e.g. because that tower was facing a hill, and so did not advance fast enough for the steeper inclination. Misalignment and/or faulty recovery from a misalignment, can cause damage to the machine. In a leading bow misalignment, extreme tension or pull is placed on the joints between the adjacent spans of a misaligned tower that could cause structural damage. In a reverse bow misalignment, there is a compression of the entire system. When the spans are compressed they tend to lose their inherent strength. Even when there is not structural damage, conventional approaches to misalignment are labor intensive and time consuming. Manual recovery may involve visual inspection of a tower that is out of alignment, diagnosis of the system state, external towing of one or more towers, and recovery of the machine to an aligned state before re-starting the normal irrigation mode.

SUMMARY

In a first aspect a network system provides enhanced operation of a motor-driven tower in an irrigation system. The tower has a station control system with a network switch that is installed near an intermediate tower. The network switch provides a capability for a remote computer on a network or a main computer at a pivot control station to perform address-based message communication with a controller at the intermediate tower. A configuration component receives a parameter list of one or more parameters and applies the list of parameters to a controlled component at the intermediate tower control station. An angle storage component operates to store a current angle that is sensed between the two span members that attach to the tower, and so are adjacent. A comparison component operates with two thresholds: a run threshold and a stop threshold. When the current angle is greater than the run threshold, the comparison component activates a run signal over a drive signal interface and causes a motor to provide drive force for the intermediate tower. As the drive force is applied, the angle decreases, and when the angle is below the stop threshold, the comparison component sends a signal over a drive signal interface to stop the motor.

In another aspect, the system provides communication and irrigation support from a user interface at a main computer at the pivot station or at a remote computer that networks to an intermediate tower controller. A graphical control in the graphical user interface receives a user selection of an information item that is associated with the intermediate tower. The controller at the intermediate tower receives a parameter list of one or more parameters via an internet protocol that pertain to a selected information item. A configuration component at the intermediate tower applies the one or more parameters to configure a controlled component associated with the intermediate tower. An angle storage component operates to store a current angle that is sensed between the two adjacent span members. A comparison component operates with two thresholds: a run threshold and a stop threshold. When the current angle is greater than the run threshold, the comparison component activates a run signal over a drive signal interface and causes a motor to provide drive force for the intermediate tower. As the drive force is applied, the angle decreases, and when the angle is below the stop threshold, the comparison component sends a signal over a drive signal interface to stop the motor.

In an additional aspect the system provides a computer hardware device with software that facilitates a method that controls the operation of an irrigation system. A computing device at an intermediate tower receives a parameter list that includes an indication of threshold modification. The thresholds at the intermediate tower include for example a run threshold, a stop threshold, a safety shut-down high threshold, and a safety shut-down low threshold. A modification of a threshold is applied. The comparison component runs with the modified. threshold. When the current angle is greater than the run threshold, the comparison component activates a run signal over a drive signal interface and causes a motor to provide drive force for the intermediate tower. As the drive force is applied, the angle decreases, and when the angle is below the stop threshold, the comparison component sends a signal over a drive signal interface to stop the motor.

Embodiments provide enhanced machine control that achieves faster recovery from faults, new operating modes, the ability to repair remotely, and to coordinate and automate multiple moves in a recovery.

BRIEF DESCRIPTION OF THE DRAWINGS

Aspects of the technology described in the present application are described in detail below with reference to the attached drawing figures, wherein.

DETAILED DESCRIPTION

Figure 1:
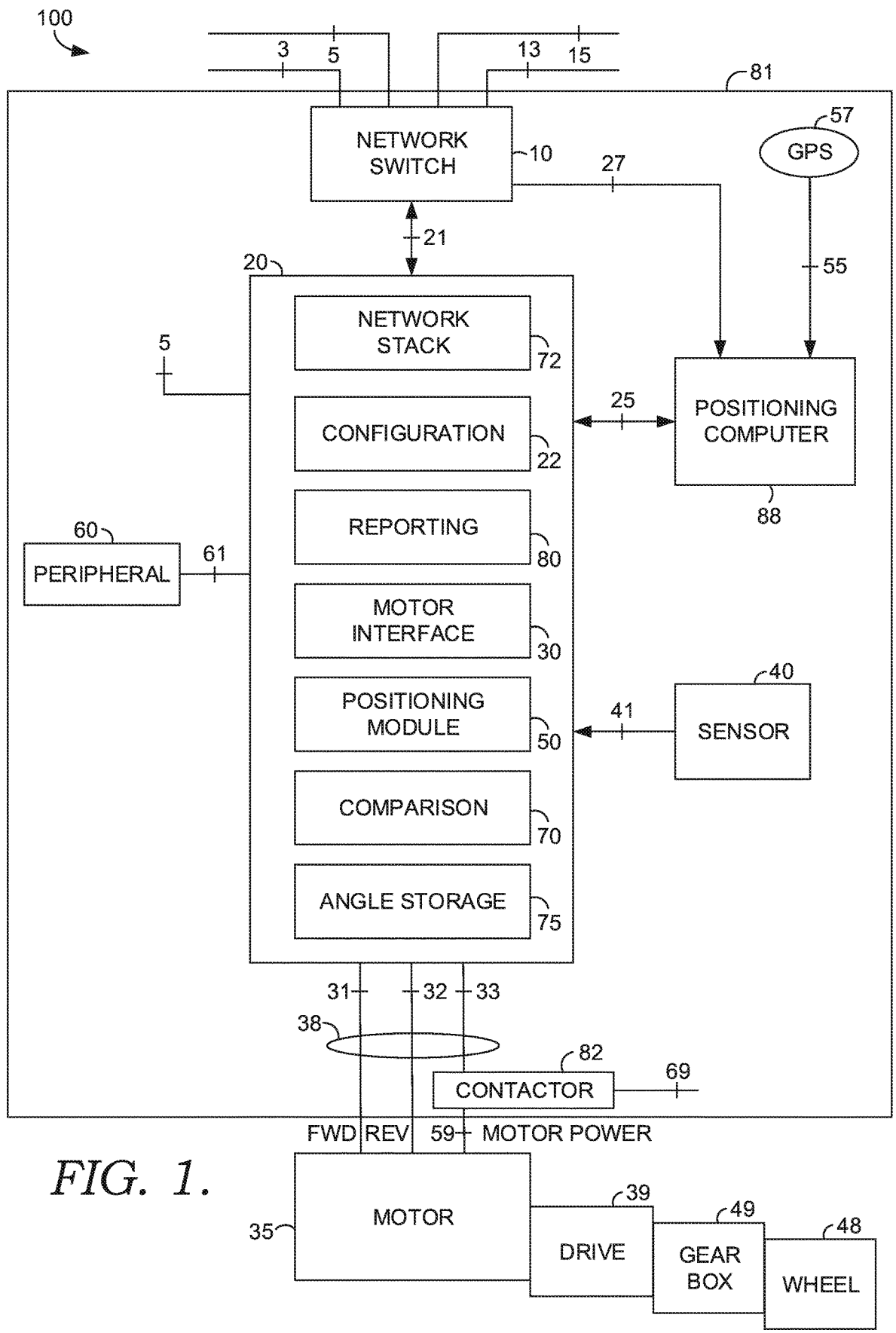
FIG. 1 is a block diagram of an exemplary system for providing communications and irrigation support.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As one skilled in the art will appreciate, embodiments of this disclosure may be embodied as, among other things: a method, system, or set of instructions embodied on one or more computer readable media. Accordingly, the embodiments may take the form of a hardware embodiment, a software embodiment, or an embodiment combining software and hardware. In one embodiment, the present technology takes the form of a computer-program product that includes computer-usable instructions embodied on one or more computer readable media.

Computer-readable media can be any available media that can be accessed by a computing device and includes both volatile and nonvolatile media, removable and non-removable media. By way of example, and not limitation, computer-readable media comprises media implemented in any method or technology for storing information, including computer-storage media and communications media. Computer storage media includes both volatile and nonvolatile, removable and non-removable media implemented in any method or non-transitory technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning now to FIG. 1, there is depicted therein a block diagram of an exemplary system 100 for providing communications and irrigation support. Network switch 10 is installed proximate to an intermediate tower (e.g. graphically depicted intermediate tower 810) of an irrigation machine or system 400 depicted in block diagram form in FIG. 4. Network switch 10 is installed, for example in a utility electrical box on a structural member of a tower, on an adjacent span member (e.g. spans graphically depicted in 807 and 812) or on a member of an adjacent tower or pivot point (e.g. graphically depicted adjacent tower 805 or 815). A computer such as main computer 506 or remote computer 507 communicates via router 509 of FIG. 5 by electronically addressing controller 20 through the use of an internet destination network address using communication protocols such as the Internet Protocol (IP) and the Transport Control Protocol (TCP). A controller 20 is for example a computer, or a microcontroller such as an ESP family, AIM or PIC microcontroller. Components of controller 20 such as network stack 72, configuration component 22, positioning module 50, reporting component 80, comparison component 70 and angle storage 75 are implemented in hardware, software or a combination of hardware and software. Constituent components of controller 20 are implemented as discrete components, a single board, or multiple boards. Network switch 10 performs packet switching based on MAC address and/or layer 2 addressing. Controller 20 couples to network switch 10 through an interface 21 such as an Ethernet port interface cable. In an embodiment controller 20 is coupleable for electrical continuity through an electrical contact to wired interface 21. Wired interface coupling comprises one or more of mechanical coupling, pressure connector coupling, screw post coupling, solder coupling, wire nut coupling, and electrical contact coupling.

Figure 5:
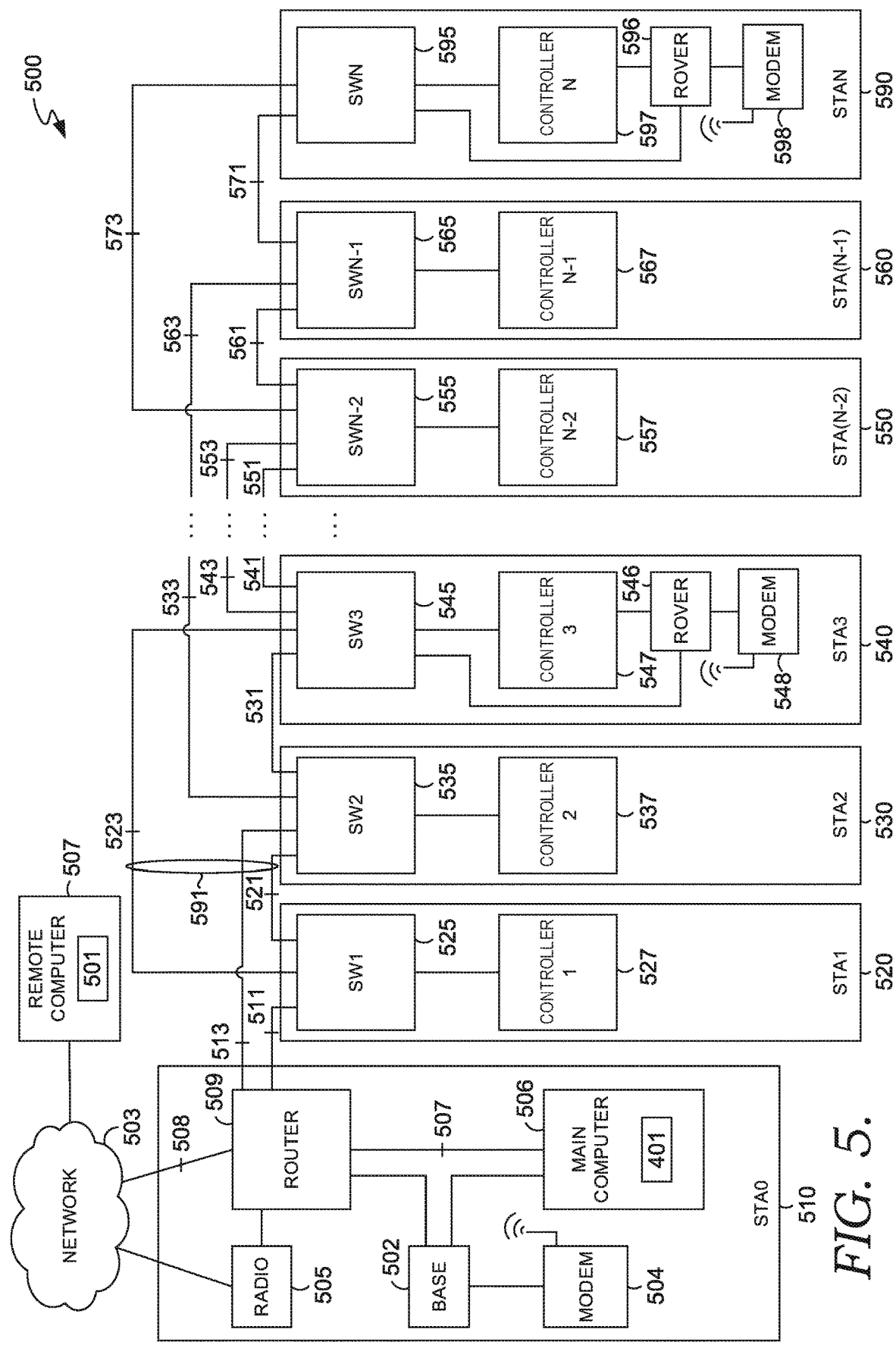
FIG. 5 is a block diagram depicting data flow aspects of a system for providing communications and irrigation support.

In an embodiment, controller 20 has wire terminal blocks that couple to wired interface 21, or other physical interface for coupling to an Ethernet Cable. In an embodiment network switch 10 is mounted in the same enclosure with controller 20 on the same board or on boards that are electrically coupled to one another. Network Switch 10 learns the MAC address of controller 20, positioning computer 88, and the corresponding network devices attached to ports of the network switch 10 through network interfaces such as network interfaces 3, 5, 13, 15, 21 and 27. Network switch 10 receives a packet over network interface 3 recognizes the MAC address for controller 20 and forwards the packet through network interface 21. In a similar fashion Network switch 10 forwards a packet received on network interface 3 to the network device on network interface 13 or the device on network interface 15 when the packet is destined for a controller at another tower in that direction. In an embodiment, switch 10 forwards packets based on configuration data such that packets received from the pivot side are forwarded in the direction of the final tower, and packets that are received on the final tower side of the network switch 10 are forwarded in the direction of the pivot. In an embodiment network switch 10 simply flood-forwards packets received on one port to all other ports. Switch 10 couples for communication in the direction of the pivot to one or more interfaces 3 and 5 to network devices such as a router or a switch as depicted in FIG. 5. Network Switch 10 couples for communication in the direction of the final tower to one or more interfaces 13 and 15 to one or more switches or devices as depicted in FIG. 5. Accordingly, interfaces 3, 5, 13, 15, 21 and 27 may be over a suitable standard Ethernet connection involving 2-pair Ethernet, 4-pair Ethernet, fiber-optic interface or other physical layer interface. Additionally, an interface such as network interface 3, 5, 13, 15, 21 and 27 may include one or more of custom filtering for extended range, lower rate communication for extended range, a series signal repeater, and a bridge. Network stack 72 performs network processing for messages received and transmitted over interface 21 and/or network interface 25. In an embodiment interface 25 is a custom serial interface suitable for carrying messages to and from positioning computer 88, e.g. using a Universal Asynchronous Receiver/Transmitter WART). A serial cable may be for example low voltage DART, RS232 or custom wired connection.

Electrical control components shown in system 100 are generally installed at the ith tower to form an electrical control station 81 generally labeled as STAi, where 0<i<N+1 for a tower control station. In an embodiment, a control station 81 also comprises a motor 35. An electrical control station 410 generally labeled STA0 is present at the pivot point, but generally does not include drive motor for physical movement of the station, since the pivot point is stationary. The number "i" therefore generally refers to the station (either pivot or tower) at which the electrical control station is generally located. Components of a control station, such as switch 10, controller 20, peripheral 60, sensor 40, positioning computer 88 and GPS receiver 57, are optionally installed in one or more enclosures at the top of a tower, at or near the joint between spans adjacent to the tower being controlled by control station 81 STAi. In an embodiment, STA0 and STA1 are adjacent to one another at the pivot point.

When a message is sent from network switch 10 over interface 21 at controller 20, network stack 72 parses the incoming data stream, and buffers a receive payload message for local processing, and notifies configuration module 22 that a new payload message has arrived. Network stack 72 performs protocol processing such as Ethernet processing, IP processing, TCP processing, and Message Queuing Telemetry Transport (MQTT) processing. Network stack 72 performs receive network processing of a message that was addressed to controller 20, for example from computer 507 or computer 506 of FIG. 5. A computer such as 506 or 507 is running a central control program, and/or an alignment control program and interacts with a user through a display interface 401 or 501 to define variables for the control program that are sent to controller 20 and received in an array of one or more parameters. In an embodiment Network stack 72 performs security processing by operating one or more secure protocols or libraries such as Hypertext Transfer Protocol Secure (https), Authentication Authorization and Accounting (AAA). In an embodiment network stack 72 performs a protocol similar to any named protocol. In an embodiment a combination of protocols are performed by network stack 72

Configuration module 22 parses the new payload message, and receives an array of one or more parameters for configuration of a controlled component (e.g. controlled component 30, 40, 50, 60, 70, 75 or 80) associated with control station STAi 81 which is associated with motor 35. In an embodiment, motor 35 is at an End of System (EOS) tower, such as station 590 labeled STAN. In an embodiment, motor 35 is an intermediate tower located between the pivot and the EOS tower. In an embodiment, configuration module 22 authenticates a signature parameter in the message to authenticate that the message was sent from an authorized entity, such that when the signature is verified the message is used, but when the signature verification fails, the message is discarded. A parameter is defined by a field of binary indications that are taken together through logical processing to indicate a value of a controlled variable within a controlled component. A parameter is applied by defining the control value for the controlled component. In an embodiment, a parameter in a received message indicates at least one of a machine operation mode and a tower operation mode. A parameter that indicates machine operation mode may include an indicator of machine align mode, an indicator of machine run mode and an indicator of shut-down mode. A parameter indicating tower operation mode may indicate windowed run mode, multi-speed run mode, or variable speed run mode. A parameter indicating positioning algorithm may indicate none, local position, and last tower position.

Controller 20 is connected through interface 61 to peripheral 60, to transmit and/or receive data. A peripheral 60 is a device associated with control station STAi 80, so that components of the tower moved by motor 35 may receive configuration parameters from a computer 506. Peripheral 60 may also provide raw data over interface 61 to reporting component 80. In an embodiment, reporting component 80 formats data into a message field in a data value and a data type identifier and a message is sent to a computer such as main computer 506. In an embodiment, a data type identifier is a numeric or alphanumeric identifier that is associated at the main computer with a text description that describes the data variable. Peripheral 60 may include a temperature sensor that monitors oil temperature of motor 35. Reporting component 80 a motor temperature warning threshold and an alarm motor temperature threshold for application to motor temperature. If the temperature of motor 35 exceeds the motor temperature warning threshold, reporting component 80 sends a warning to the Main Computer 506. If the temperature of motor 35 exceeds the alarm motor temperature threshold, controller 20 sends an alarm to Main Computer 506. Peripheral 60 may also be a motor current sensor that sends motor current value raw data to reporting component 80. Reporting component 80 reports to a computer, such as computer 506, the raw motor current data, and/or an outcome of a comparison to a warn motor current level and an alarm motor current level.

Generally, peripheral 60 may include but is not limited to one of the following: a temperature sensor, a motor with variable frequency drive (VFD) drive level input, an infrared sensor, a tire pressure sensor, a motor current sensor, a motor temperature sensor, a motor torque sensor, a position sensor, an image sensor, an angle sensor, a variable rate valve, a flow rate sensor and an environmental sensor. Peripheral 60 generally provides raw data to controller 20 over interface 61. Controller 20 may simply send the raw data in a field of a message as report data to Main computer 506. Controller 20 may also apply one or more thresholds to determine equipment or other status conditions at the associated tower of controller 20, and provide the associated report data to main Computer 506. Report data sent by reporting component 80 to main computer 506 may generally include, for example: tire pressure, current, temperature, torque, position, an image, current angle, exception based error information, information used for predictive maintenance, information used for preventative maintenance, information that a safety shutdown is required to prevent damage to the system, oil temperature, water pressure, valve state, valve rate, environmental sensor, VFD level, drive direction and infra-red data. An unsafe safety condition generally refers to a condition entered to prevent damage to the system. In an embodiment, reporting component 80 prepares a report of tower state, and sends via the network switch 10 report data related to comparing one or more of tire pressure, motor current, temperature, torque, position, image, current angle, exception based error information, oil temperature, water pressure, valve state, valve rate, environmental sensor, VFD level, drive direction and infra-red data to one or more thresholds. Information sent in the report of reporting component 80 may include for example, a range indicator and/or a binary level indicating the sensor value relative to a threshold.

In an embodiment, reporting component 80 is configurable by configuration component 22. A reporting parameter list is provided from Main Computer 506 to configuration component 22. Configuration component 22 modifies the reporting data that is reported by reporting component 80 to include all items identified in the reporting parameter list.

In a variation, reporting component 80 is implemented in a second controller and the reporting component 80 communicates with controller 20 by serial communication or by connection on an additional line to a port of network switch 10.

During operation of the machine in a run mode controller 20, e.g. located at a tower (e.g. graphically depicted tower 810) in control station STA3 periodically reads the angle between two adjacent span members (such as graphically depicted adjacent span members 807 and 812) from sensor 40 over interface 41. Interface 41 is for example a digital interface of one or more lines, such as a UART interface or other serial or parallel data interface that provides an indication of binary angular measurement (BAM) in one or more data bits quantifying the current angle sensed by sensor 40. In this case, the sensor 40 serves as a component that stores angle by providing output buffer storage for current angle sensed. For example, a 12 bit angle value in BAMS is stored within sensor 40 and provides to controller 20 a digital signal indicating an angle measurement that provides approximately 5.6889 BAMs per degree.

Alternatively, interface 41 is an analog input to controller 20 that continuously reflects current angle sensed by sensor 40. So that controller 20 includes an A/D converter that produces a digital current angle sensed, e.g. a BAM level that reflects the current angle between adjacent span members, e.g. graphically represented span members 807 and 812. Controller 20 periodically measures the angle, e.g. provided by sensor 40 and stores in angle storage 75 the value of the current angle sensed by sensor 40. In an embodiment sensor 40 is fitted with one or more mechanical adjustments such as screws or thumbscrews that adjust the angle at which 180 degrees is indicated by the angle sensor 40. In an embodiment, a sensor at a tower such as graphically depicted tower 810 includes a control arm mounted at the joint between two adjacent spans that are graphically represented by spans 807 and 812. One or more control rods extend away from the joint to provide an angular reference that is used as a basis of sensing the angle at the joint.

In an embodiment positioning component 50 determines current angle sensed by processing location information, e.g. received at controller 20 by positioning module 50 from positioning computer 88 over interface 25 in the current station e.g. STA3. Positioning information is also received from a prior station, e.g. STA2 in the direction of the pivot. Positioning information is received from a subsequent station, e.g. STA4 in the direction of the EOS tower. A positioning computer 88 at a station computes a position estimate of the current station based on measured GPS position calculated by GPS receiver 57 and received by positioning computer 88 over serial interface 55. Exemplary relative position may be determined, for example, and may include but is not limited to differential GPS, or by real-time kinematic (RTK) positioning which enhances the GPS accuracy using carrier-phase enhancement. A base GPS location such as 502 serves as a reference location and station position relative to STA0 is computed by rover stations 546 and 596 at stations STA3 and STAN respectively. The GPS information is shared for example through radio modems 504, 548 and 598 and/or by the use of the communication network such as that shown in FIG. 5. Using GPS data in this fashion, a current sensed angle may be computed by positioning component 50, e.g. at a station STA3 for span angle between adjacent spans such as graphically represented spans 807 and 812. In an embodiment, angle storage 75 is configurable with a parameter to determine whether to use sensor 40 for angle measurement or to use positioning component 50. A parameter received by configuration component 22 is applied to storage component 75 to provide either GPS based angle or angle based on sensor 40.

Continuing with the tower processing of a station as depicted in system 100 of FIG. 1, comparison module 70 compares the current angle value to two or more reference threshold values T1 and T2. In an embodiment, T1 is the run angle and T2 is the stop angle. When the current angle value is between T1 and T2 comparison module 70 determines to continue applying drive signal through motor interface 30 to motor 35 using exemplary drive signal interface 38. Motor interface 30 comprises a wired interface terminal that couples to drive signal interface 38 which is a wired interface. When a drive signal is applied to motor 35 a drive force is applied to the tower associated with motor 35 through at least one wheel 48, e.g. through a drive shaft 39 which is mechanically coupled to motor 35. Drive shaft 39 is also mechanically coupled through gear box 49 to wheel 48. When the drive force is applied to wheel 48 the tower on which motor 35 is mounted begins to move in the direction indicated by the drive signal interface 38. In an embodiment, an AC 110 volt signal is provided, e.g. through a single pole double throw switch in motor interface 30 giving only one AC 110 volt signal on interfaces 31 and 32 to indicate respectively a forward (clockwise) and reverse (counter-clockwise) rotation of the machine about the pivot effected by motor 35. The interface 31 is likewise, in an embodiment an AC 110 input to contactor 82. When voltage is present on interface 33, contactor 82 routes Motor power 69 to motor 35 through interface 59. In an embodiment, motor power 69 is a four wire AC interface of 3 phase power. In an embodiment, motor power 69 is a three wire AC interface providing single phase power. In an embodiment, motor power 69 is DC power. In an embodiment the frequency of AC one of 50 Hz, 60 Hz, and a frequency rate that is variable. In an embodiment the voltage used for motor power 69 is nominally set at a point in the range between 10 volts to 600 volts, such as 480, 240, 120, 24, or 12 volts.

As the drive force is applied by motor 35, the angle measured by sensor 40 changes until the angle is outside of the active range, whereupon the drive signal interface 38 cuts power to motor 35 by switching off contactor 82. Motor interface component 30 is for example a software driver that controls an area of memory with bit-mapped controls that activate a set of voltage controlled relays or switches that receive AC input 5, and selectively either route or don't route AC voltage to output lines 31 32 and 33. Motor interface 30 includes in an embodiment a single pole single throw switch to connect AC voltage output independently to one or more wired interfaces 31, 32, 33 of drive signal interface 38. In an embodiment, contactor 82 is integrated into motor interface 30. Controller 20 includes motor interface 30 that includes one or more terminal endpoints that are suitable for coupling one or more digital or analog wired interfaces from controller 20 to motor 35. Drive signal interface 38 comprises one or more digital or analog wires for passing control information from controller 20 to motor 35.

Configuration component 22 has the ability to receive parameters related to a run mode from Main Computer 506. For example, Configuration component 22 may receive direction of travel, duty cycle, move indication, and a variable frequency drive (VFD) level. Parameters may include a motor temperature warning threshold, an alarm motor temperature threshold, a warn motor current threshold, and an alarm motor current threshold. General run mode parameters may be applied for example, by placing a motor 35 in a disconnected state locally, by disconnecting power from motor power input 59, by the deactivation of control interface 33. The run mode parameters are then changed, and then the motor interface 30 is returned to a normal run state. In an alternative, a machine alignment mode is entered by Main Computer 506 and all towers are set at idle as configuration parameters are updated by configuration component 22.

Figure 2:
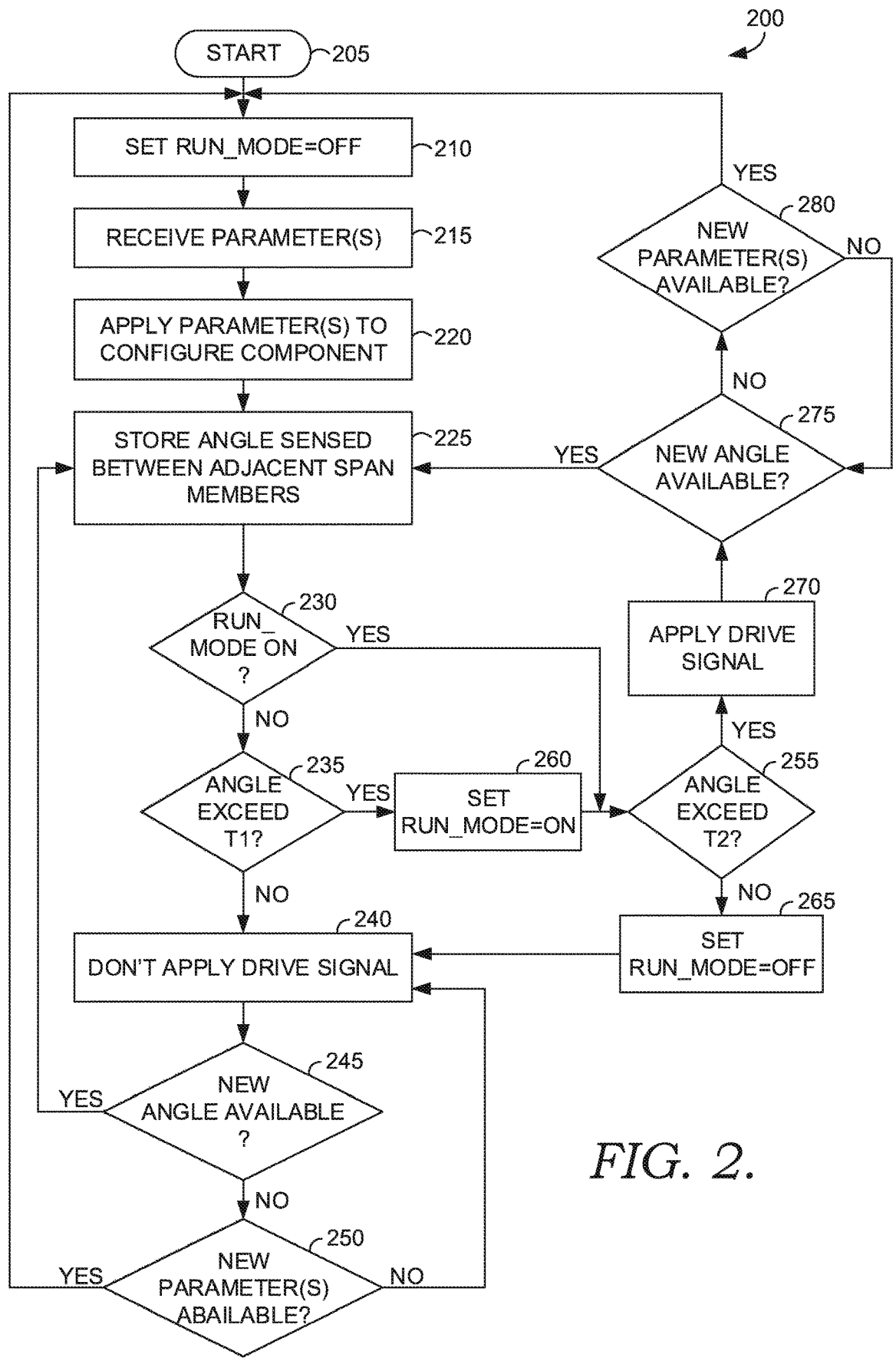
FIG. 2 is a flow diagram providing an exemplary method of controlling operation of an irrigation system suitable for operation on one or more computer hardware devices in computer-executable instructions.

Turning now to FIG. 2 there is shown an exemplary flow diagram for a method of controlling operation of an irrigation system suitable for operation on one or more computer hardware devices in computer-executable instructions. In a windowed run mode embodiment, for example, operation may be performed with four thresholds T3>T1>T2>T4. The speed of the motor is maintained at a constant drive level when the angle is between T1 and T2. The Motor is shut off when the current angle sensed is between T3 and T1, and when it is between T2 and T4. In an embodiment, a safety shut-down of the machine is enacted when the current angle sensed is less than T4 or greater than T3, so that T4 is a shut down low angle threshold and T3 is a shut down high angle threshold. The method begins at 205 and proceeds to 210 where the run-mode of the local tower is set to off. One or more parameters such as T1, T2, T3, and T4 are received at 215, e.g. from a main computer 506 when the machine is in an align mode. The method proceeds to 220 where one or more parameters are applied to the comparison component 70 by the configuration component 22. In an embodiment, operation variables in memory are modified by the configuration component 22 so that comparison component 70 has new thresholds. When the machine state changes to a windowed run-mode the method proceeds to 225 where an angle measurement sensed between adjacent span members using sensor 40 is stored in angle storage 75. In an embodiment, at 225 the method tests whether the sensed angle is greater than T3 or less than T4, and if so, the machine state is set to safety shutdown with an out of angle tolerance alarm condition is sent to the Main Computer 506, and the method terminates. If alternatively the sensed angle is between T3 and T4 then the method proceeds to 230. At 230 the method determines whether or not the local tower is already in a motor run mode, i.e. if run mode=on. If no, then at the method proceeds to 235 where the current angle is compared to a threshold T1. If the current angle does not exceed the threshold T1 then the method proceeds to 240 where the comparison component 70 determines that the system does not apply drive signal, and so the motor interface 30 is set to remain in a no drive-signal state, and the method proceeds to 245. At 245 the method awaits a new angle. This may be performed by waiting a predetermined amount of time such as 1 second before another sample is drawn from sensor 40 and the method returns to 225. Alternatively, the angle that is experienced may be continually monitored, and the method does not return to 225 until a substantial enough change in the current angle is encountered to warrant a new comparison. If no new angle is available at 245, the method proceeds to 250 where the method determines whether or not one or more new parameters have become available to comparison component 70. If yes, then the method returns to the beginning at 210. Alternatively, at 250 if no new parameters are available the method returns to 240. Returning to 235, if the angle does exceed T1 then the method proceeds to 260 where the run mode is set to on at 260 and the method proceeds to 255. Returning to 230, we also proceed to 255 if at 230 the run mode is already set to on. At 255 the current angle sensed is compared to a second threshold T2. If the angle does not exceed. T2, then the method proceeds to 265 where the run mode of the tower is set to off, and the method proceeds to 240. Returning to 255 when the current angle sensed does exceed T2 the method proceeds to 270 where the drive signal is applied to using 35 through motor interface 30. In an embodiment, the drive signal is applied by simply turning the motor power on as depicted in FIG. 1. In an alternative embodiment, a drive signal includes a duty cycle that turns the motor on for a period of time, and then shuts it off for a period of time. In an embodiment, the drive signal includes a VFD level that is applied to the motor. In an embodiment the drive signal includes an AC control signal that constantly routes power.

As an illustration of parameter variation in the windowed run mode embodiment, suppose that all towers are set by default to have T1=190 deg, T2=178 deg, T3=200 deg and T4=170 deg. When the system is operated in machine run mode, it is discovered that station 3 tower encounters a hill with the default parameters a safety shutdown is encountered. As a result, an operator at Main computer 506 decides to adjust the running thresholds. Therefore, a new T1 is set to 185 deg and a new T2 is set to 176 deg. The new parameters are sent to a controller at station 3 such as controller 20. Configuration component 22 receives an indication of threshold modification, such as new threshold values, new tables, and/or a mode in which to apply new threshold values. Configuration component 22 then modifies the thresholds used in comparison module 70. The received thresholds T1 and T2 are applied by loading them into comparison component 70 when the machine is in a maintenance mode and/or using the thresholds at an appropriate time. After aligning the machine, the system is restarted and runs using the new thresholds without causing the system to hit a safety shut-down event. In an embodiment a threshold value is expressed in BAM units.

In a variation of the method of FIG. 2 at 260 a run-time timer is started and the total amount of time that a tower is in the run state is maintained. At 270, before a drive signal is applied, a test may be performed to see if the run-time is above a max tower run time threshold. If yes, then the run-mode is set to off, and the method returns to 210. Likewise, at 255, after it is determined that the current angle does not exceed T2, a test is performed to see if the run-time is below a minimum threshold of tower run time, if yes, then the method proceeds to 270 even when the current angle does not exceed T2, if the current angle does not exceed T2 and the run-time is greater than the minimum threshold of tower run time, the modified method proceeds from 255 to 265.

In a variation of the method of FIG. 2, a multi-speed run mode is provided in which an optional additional pair of thresholds T5 and T6 may be employed in comparison component 70 and three motor velocities are employed at the tower: Variable speed High VH, Variable speed Medium VM, Variable speed Low VL, Variable speed Low-Low VLL, and Variable speed High-High T3>T5>T1>T2>T6>T4. When the measured angle is between T1 and T2 a motor speed of VM is output to motor 35 over drive signal interface 38. When the measured angle is between T1 and T5 a motor speed of VH is output to motor 35 over drive signal interface 38. When the measured angle is between T5 and T3, a motor speed of VHH is output to motor 35 over drive signal interface 38. When the measured angle is between T2 and T6 a motor speed of VL is output to motor 35 over drive signal interface 38. When the measured angle is between T6 and T4 a motor speed of VLL is output to motor 35 over drive signal interface 38. A multi-speed mode may be used to advantage to support a station-keeping design that keeps the stations all moving at constant rotational velocity to maintain very tight angles resulting in less likely safety failures. An embodiment of a multi-speed drive mode has only three speeds and four thresholds. An embodiment of a multi-speed drive mode has angles centered about 180 degrees.

In a variation of FIG. 2, the motor speed is continuously variable and a function of the current measured angle. For example, a nominally chosen speed VN, and a Current Angle Value (CAV) an output continuously variable speed V may be related through a constant vr, so that V=VN+(CAV−180)*vr. The current motor speed is then a nominal speed VN plus a variable speed offset that is linearly proportional through a constant vr to the current angle value CAV measured relative to a straight line. The result being that the larger the angle measured, the greater is the differential velocity that is employed to correct the tower to alignment. In an embodiment the velocity is limited to always provide a non-negative velocity. In an embodiment the applied velocity is limited to provide no more than a maximum positive velocity. In an embodiment a different function is employed that produces a different differential velocity offset. In an embodiment the function used provides a different constant VN for each tower so as to give a constant angular rotation speed of the entire aligned system about the pivot. In an embodiment VN is a function that varies based on a speed selection for the EOS tower. In an embodiment the value of VN for STAi is a function of i, so that the value of VN is a table look-up for each tower, returned as a function of i and/or a calculated or predetermined as a term that incorporates i into the function used.

In a variation of FIG. 2, positioning module 22 maintains a current position reference estimate. A current position reference may be estimated using positioning component 88 at estimates position through the use of GPS receiver 57 and optionally communication with base 502 to form a relative location estimate. A location estimate is received by configuration component 22 through interface 25 from positioning computer 88. Another example of a current position reference estimate is a remote reference formed by the EOS positioning component 596 of FIG. 5, which is received by configuration component 22 of controller 20 through switch 10. An additional example of a current position reference estimate is a local reference that estimates the position of control station STAi 81, when positioning component 50 forms a calculated estimate from one or more remote position estimates and information about the system structure such as span lengths, and angle sensor values.

Configuration component 22 receives the position estimate from positioning module 50. Configuration component 22 receives data to provide variable parameter settings, such as one or more thresholds that are based on current position reference estimate. For example, a first threshold value is provided for a first estimate, and a second threshold value is provided for a second and different position reference estimate. In an embodiment, any parameter is a function of position. An exemplary method for providing a variable assignment forms a fail-through table based on the machine rotation angle estimate that is derived from the position estimate. So that a position estimate is converted into a machine rotation angle, and then a table is built having at each Machine Rotation Angle (MRA), a set of parameter assignments. At an input MRA, one or more parameters are provided such as one or more of T1, T2, T3, T4, T5, T6 VL, VM, VH, vr, VN. A first MRA denoted MRA1 is associated with T11, T21, T31, T41, T51, T61, VL1, VM1, FH1, vr1, and VN1. But, a second MRA, denoted MRA2, is associated with T12, T22, T32, T42, T52, T62, VL2, VM2, VH2, vr2, and VN2. The fall-through table then provides the reference parameters for the nearest MRA to the current position estimate. For example, when a parameter identifies the current run mode to be the windowed run mode, and MRA is near to MRA1, then configuration component 22 provides T11 and T21 to comparison component 70. But, when MRA is near to MRA2, then configuration component 22 provides T12 and T22 to comparison component 70. In an embodiment, an entire fail-through table is created on main computer 506 and a portion of the fall-through table is transferred to controller 20 for operation by configuration unit 22. In an embodiment an operator, e.g. using main computer 506 defines information in the table for storage directly within controller 20.

As an example, configuration component 22 maintains a set of thresholds for two different machine modes. When in a windowed run-mode configuration component 22 applies thresholds T1a, T2a, T3a, T4a to comparison component 70 by setting T1=T1a, T2=T2a, T3=T3a, and T4=T4a, at a suitable time, e.g. upon initiation of windowed run-mode. Similarly, when an align mode is entered a different set of thresholds T1b, T2b, T3b, T4b are applied to comparison component 70 by setting T1=T1b, T2=T2b, T3=T3b, and T4=T4b at a suitable time, e.g. when an align mode is selected by a user, or when a shut-down fault is encountered, and computer 506 determines that the cause of shut-down was a shut-down limit angle such as T3 or T4 at one particular tower. After waiting a period of time following a shutdown, computer 506 moves the system into an align mode and subsequently applies a set of broader thresholds associated with the align mode while align mode is operational.

In an embodiment, one or more of the thresholds levels, time periods, duty cycles, VFD drive levels, motor speed levels, tower run modes, position references, position modes, and position values that are used in a tower control system are received by configuration component 22 and applied to comparison component 70, e.g. when the tower run mode is off or when the machine state is not run mode, e.g. in a maintenance mode or in an align mode of the machine.

Turning now to FIG. 5, a block diagram is depicted that highlights communication aspects of a system for providing communication and irrigation support. The machine system consists of a remote computer 507 networked to a Machine consisting of pivot control station 510 labeled STA0, and N tower stations shown representatively by stations STA1 510, STA2 530, STA3 540, STA(N−2) 550, STA(N−1) 560 and STAN 590. A network system generally provides communication between electronically addressable computer nodes 506, 527, 537, 557, 547, 567 and 597. There are depicted in system 500 therefore N−1 intermediate tower stations and one EOS station STAN 590, and a pivot control station 510, labeled ST0. Each tower station is equipped in the exemplary embodiment with switches 525, 535, 545, 555, 565 and 595. A communication cable group 591 is typically routed from station to station providing one or more cable communication interfaces for port switches at a tower station. In an embodiment only a series cable is provided in cable group 591 as depicted in cables 511, 521, 531, 541, 551, 561 and 571. In an embodiment, a second adjacent switch is wired in each direction to provide the capability to reset a switch without bringing down the network. Second adjacent redundant links are shown for example in cables 513, 523, 533, 543, 553, 563, and 571 in an embodiment, three cables are provided in cable group 591 such as cable 513, cable 523 and cable 521. In an embodiment, a cable 521 in a cable group is one of CAT-5, two-pair copper, four-pair copper, fiber optic, and the like. In an embodiment Ethernet is run at a nominal transfer rate between 9 Mb and 20 Gb, such as 10 Mb, 100 Mb, 1 Gb, 10 Gb or at any standard rate. In an embodiment, a network switch 10 is a layer 3 switch. In an embodiment network switch 10 is a network switch similar to a layer 2 switch or a layer 3 switch. In an embodiment, a network switch 10 is replaced by a router. In an embodiment, network switch 10 is a managed switch. In an embodiment network switch 10 is an unmanaged switched. In an embodiment, one or more stations such as STA1 520 do not have a network switch such as 525, but a controller 527 at the station 520 interfaces to another router 507 or switch, e.g. switch 535 in the system.

Main Computer 506 is for example a flat touch-screen computer, such that a display component 401 is capable of displaying status and receiving control information from the user on a flat-screen display. The main computer 506 communicates with base 502, which comprises a base computer and a GPS receiver, wherein the base receives pivot GPS location information from a GPS receiver at STA0. Base 502 communicates with main computer 506, for example over a serial data line. Base 502 provides reference GPS position to main computer 506 and to rover stations such as rover 546 and rover 596 so that a relative position can be computed from STA0 to an intermediate station 540 STA3 and to an EOS station 590 STAN. In an embodiment, base 502 and a rover 506 communicate using IP through router 509. Base 502 is coupled to router 509 through a data cable such as an Ethernet cable. A Radio such as radio 505 is generally a receiver and/or transmitter that operates by electromagnetic propagation through an antenna using a radio frequency (RF) or carrier frequency between 30 Hz and 300 GHz. Techniques employed by a radio such as radio 505 may include but are not limited to one or more of the following: Amplitude Modulation (AM), Frequency Modulation (FM), Frequency Shift Keying (FSK), Orthogonal Frequency Domain Multiplexing (OFDM), and Spread Spectrum. Radio 505 is for example a microwave data radio that communicates to a microwave data receiver in network 503 and communicates data to remote computer 507. In an embodiment, radio 505 is directly coupled to main computer 506 through a bi-directional data cable. Router 509 has a routing table and routing policy that are employed to make routing decisions on received packets based on the network address information in the packet. The router 509 receives packets over the ports connected to router 509 such as those connected to interface cables 507, 508, 513 and 511 and forward the packets between devices on the irrigation machine and remote devices such as remote computer 507 through computer networks 503. For example, Router 509 receives and routes packets to and from controllers on the machine such as controller 527 at station 510.

Network 503 is for example a telephony network, the internet, the World Wide Web, a local area network, a wide area network, a cellular network, a satellite network, a terrestrial microwave network, or any combination of these networks. Main computer 506 has a network stack 72 and a status display component 401. In an embodiment, main computer 506 acts as a server running web server software and AAA software to authenticate a user at a remote client such as a browser on remote computer 507 that runs status display component 501. In an embodiment, a status display component 401 is simply an active table that aggregates data and provides a portion of the table to a display of the computer device 506. The display may be a sequence of warning LED's with specific meaning. For example, a green LED is lit when the system is operational in a machine run mode, a blue LED is lit when the system is operational but in a maintenance mode, a violet LED is lit when the system is operational but in an align mode, a yellow LED is lit when the system is operational but a preventative maintenance alert is active, an orange LED is lit when the system is operational but a predictive maintenance alert is active, a white LED is lit when all maintenance alerts have been planned for remediation, and a red LED is lit when the system is in a safety shut-down status. In an embodiment the meaning of a color is assigned to a different status indication. In an embodiment a different color is assigned to a status indication. In an embodiment status is displayed on remote computer 507 using status display component 501. With a touch-screen display at computer 506, a more rich representation of machine state may be presented in addition, or instead of the graphical display of such diode indicators. Report data received from stations in the system is displayed by display component 401 such as that shown in FIG. 3 and FIG. 6. Report data is received by a computer such as 507 and displayed using display component 401. For example, a predictive maintenance alert is received at computer 507 indicating an alarm motor temperature in the motor at tower 5 as reported by STA 5, computer 507 then emits a warning tone, and a pop-up screen or display window is presented on the display of computer 507 indicating: "Pivot 5 has an alarm motor temperature in station STA5" "1 hour and 17 minutes to the next home position for maintenance." In addition, a GUI control is presented allowing a user to select an option to acknowledge the need and to set a state that indicates corresponding maintenance is scheduled. Upon selection of the GUI Control, a message is sent from computer 507 to computer 506 and the white LED is lit to reflect planned maintenance. Other predictive maintenance conditions include alarm motor current. Preventative maintenance status for conditions such as a motor temperature warning or a warn motor current are displayed likewise by display component 501. In an embodiment computer 506 receives report data and applies thresholds at computer 506 to determine if one or more thresholds are exceeded, as described herein.

Figure 3:
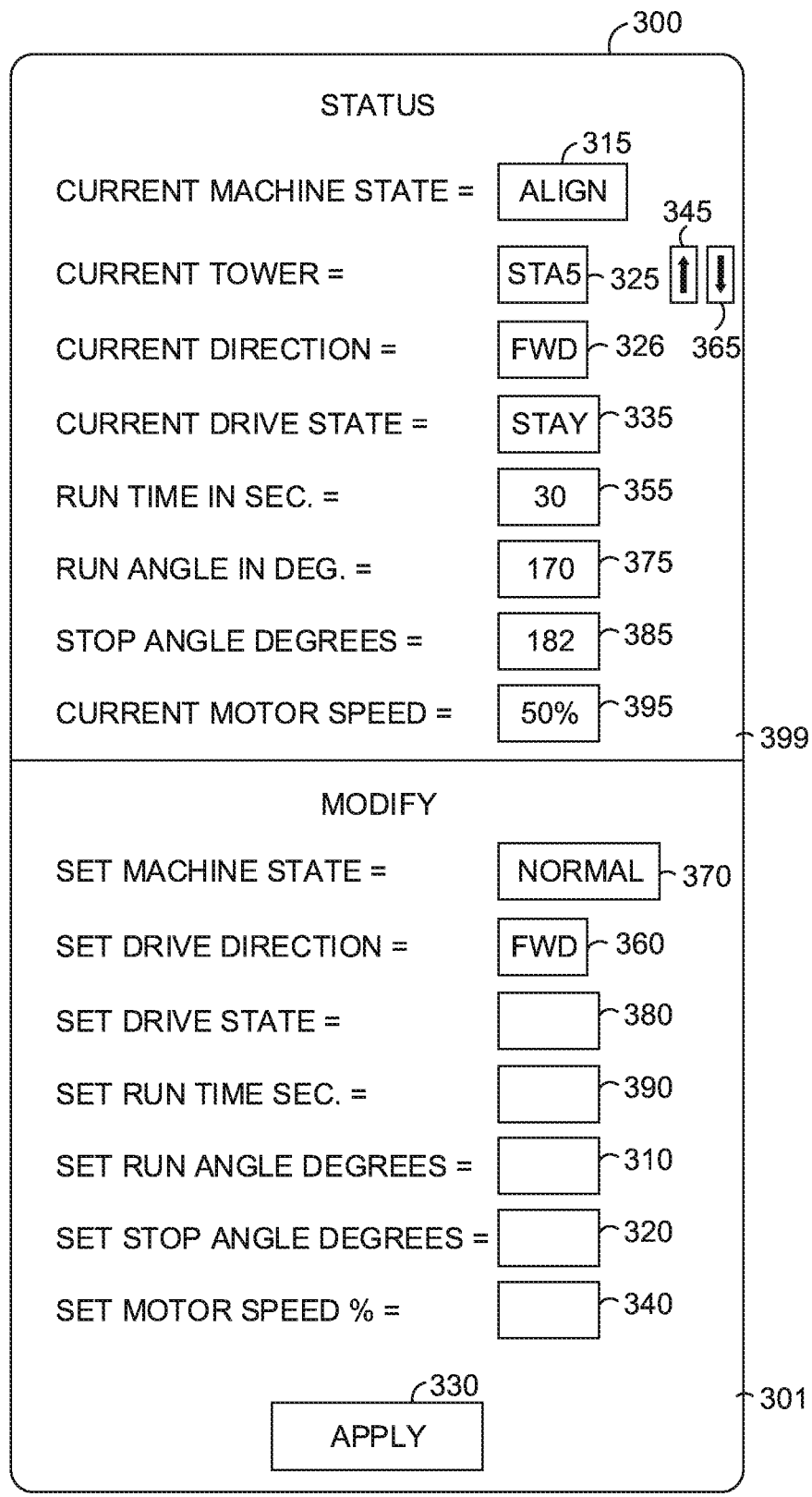
FIG. 3 illustrates an exemplary user interface that may be displayed by a user device in accordance with aspects of the technology described herein.
Figure 6:
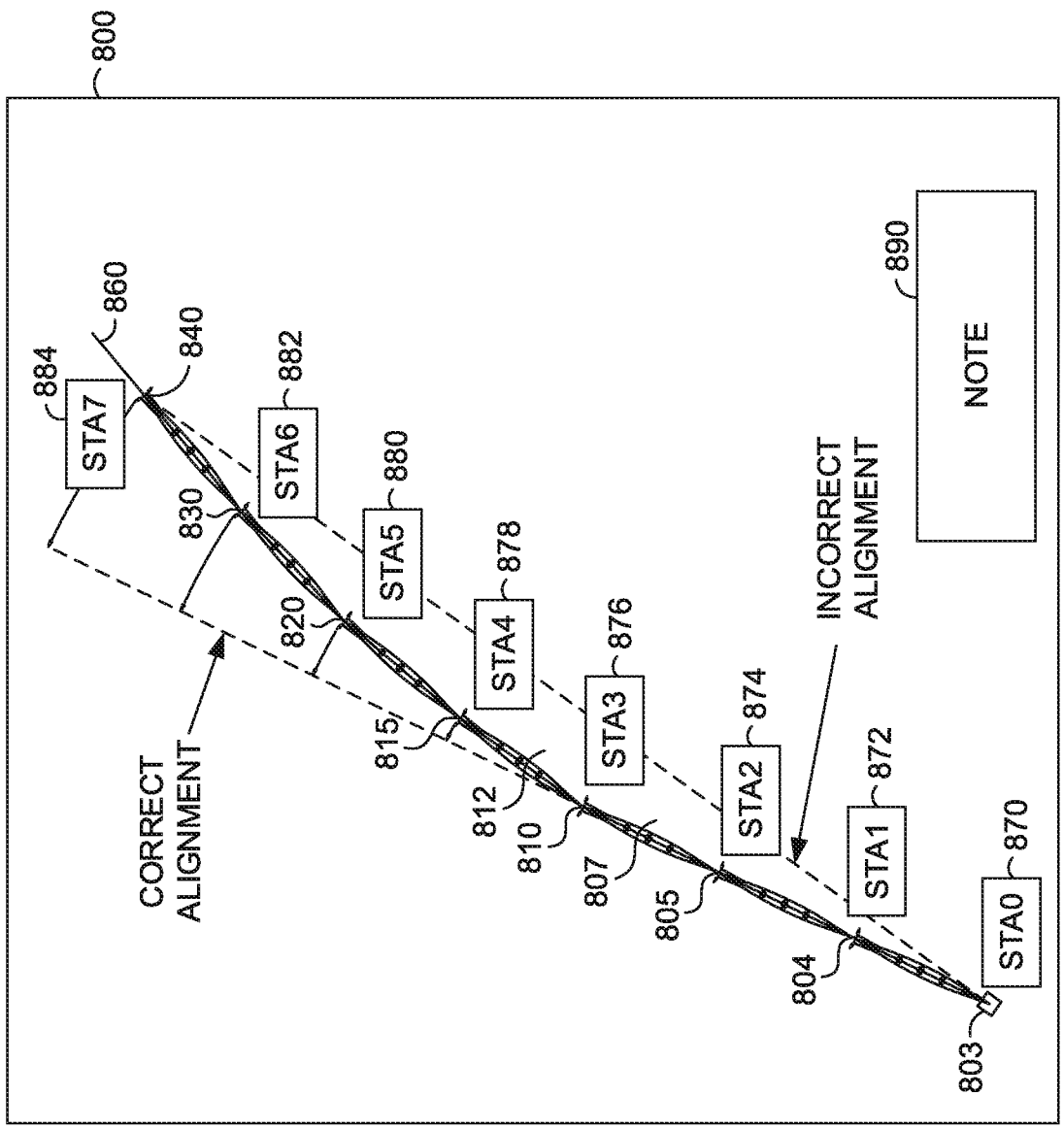
FIG. 6 illustrates an exemplary user interface that may be displayed by a user device in accordance with aspects of the technology described herein.

Safety shut-down status is displayed in a similar fashion. Additionally, machine status may be displayed as indicated by the graphical display 800, which shows an alarm condition situation displayed on a graphic display as shown in FIG. 6. There is presented in 800 a representative status display presented to a user on a computer, e.g. main computer 506. The display 800 presents a graphical indication of measured positions of the station 803 and the towers 804, 805, 810, 815, 820, 830 and 840. The display also shows boom 860. The display also contains GUI controls 870, 872, 874, 876, 878, 880, 882, and 884 showing the station labels for the towers in the system. Upon selection of one of the GUI controls, the corresponding station control parameters are presented in display 800. For example, the selection of GUI control 880 causes a display 300 to be presented as shown in FIG. 3.

A user operating a hand-held computing device such as a cell phone, upon receiving an alert of the safety shut down, opens station 5 and sees the display presented by display component 501 on remote computer 507. Simultaneously the system shows status by presenting display 800 of FIG. 6 on device 506. In display 300, the user sees a status area 399 that shows current status of some portion of the machine, such as the status of STA5. A number of variable display elements 315, 325, 326, 335, 355, 375, 385, and 395 show the current variable values with a corresponding description of the information item to the left that informs the user about the identity of each variable information item displayed by each variable display element. Corresponding GUI controls are presented similarly in the modify area 301 in GUI controls 370, 360, 380, 390, 310, 320, 340. In an embodiment, a control both shows current status and allows selection by a user to receive a user selection of the information item. In an embodiment a control toggles between a number of selections upon selection, presents a menu of selection options, presents an interface to type in a value, or presents a number of discrete choices or groups of choices for selection by a user. In the situation depicted in FIG. 6, there was a hill near station STA3, the machine was shut down due to safety as the machine was rotating in a forward (clockwise) direction. Note 890 on a computer such as computer 506 is displayed saying, "Safety shutdown" "STA3 angle measured above T3=200 deg. Align Mode has been entered and T3 has been set to 210 deg during this alignment" "Condition appears to be a Reverse Bow situation" "Suggest moving STA5 in the reverse direction for 30 sec before making other movements." The user of device 507, viewing the display 300 selects control 360 in modify area 301, resulting in the "REV" label in control 360. The user of device 507 then selects control 370 in modify area 301, resulting in the display of the "Align" label in control 370. The user then selects graphical control 390, and a keypad popup overlay is presented on display 300, whereupon the user enters "30" which is then displayed in graphical control 390. The user then selects graphical control 330 and the modified parameters are then displayed in the status area. Display area 335 changes to "MOVE", display area 326 changes to "REV". Upon selection of GUI control 330, parameters are sent to STA5 including a drive indication such as an indication of direction "REV", an indication of current motor speed "50%", an indication of mode "Align" and an indication of run time in seconds "30". Configuration component 22 receives these parameters, and applies drive signal over drive signal interface 38 to motor 35 by routing AC power to interface 32, and by routing AC power to contactor 82 through interface 33. The result is that motor 35 operates for 30 seconds. In an embodiment, drive signal interface 38 also provides a VFD indication of motor speed to operate at 50% of max power.

Display 300 generally provides access to display and/or modification capability for any quantified electronic variable associated with a machine or tower as described herein. Control 245 when selected displays information related to the next tower further away from the pivot, and displays status for that station. Control 365 when selected results in the display of information related to the next tower closer to the pivot and displays status for that station.

Figure 4:
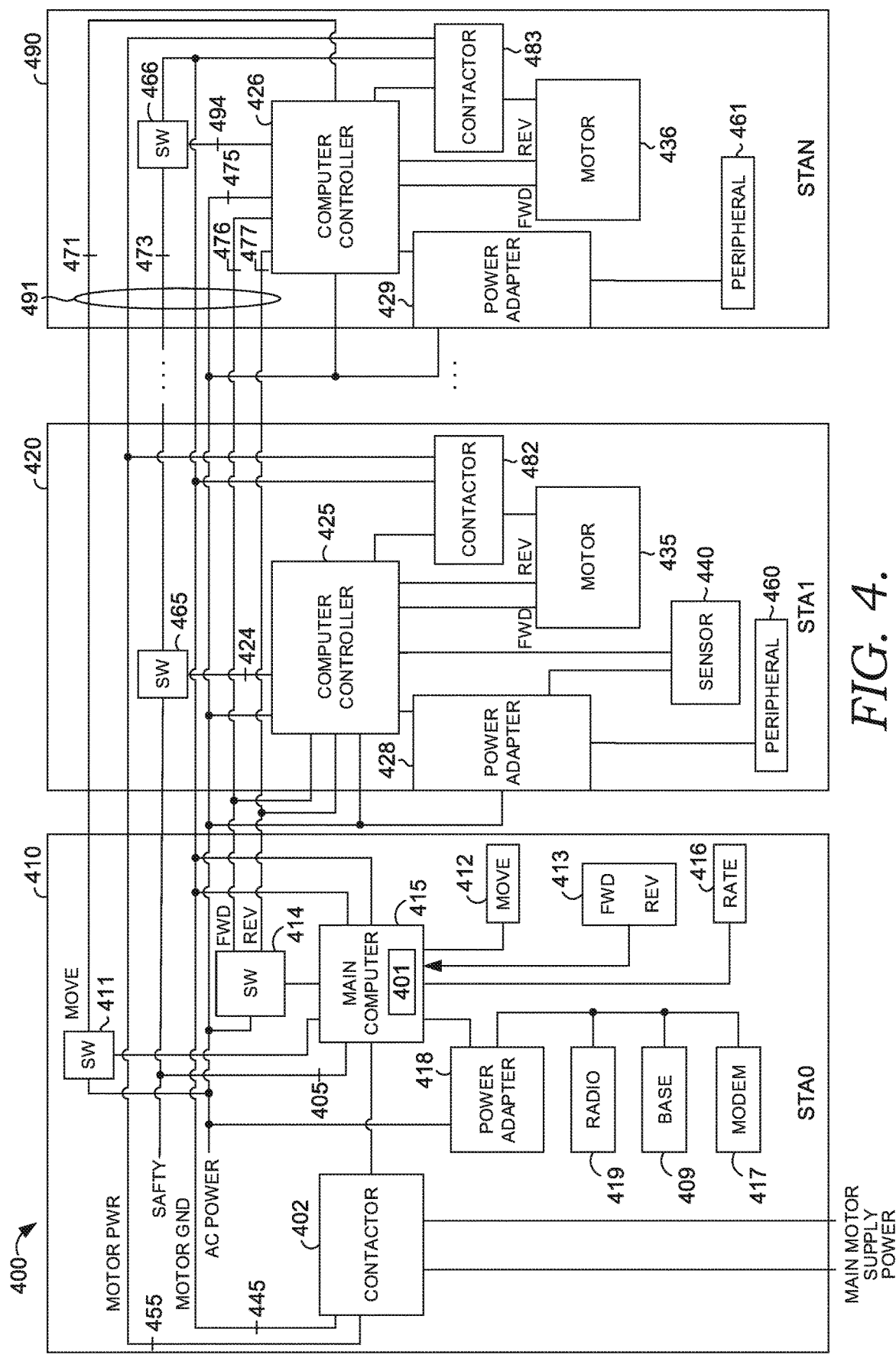
FIG. 4 is a block diagram depicting power and control aspects of a system for providing communications and irrigation support.

FIG. 4 presents a block diagram depicting power and control aspects of a system for providing communications and irrigation support. At station 410, a power adapter 418 receives AC power, e.g. 110 VAC, and provides DC power to main computer 415, radio 419, base 409, modem 417 and router 509. Likewise, in typical intermediate tower station STA1, power adapter 428 provides power to peripheral 460, sensor 440, controller 425 and switch 525 at station 420 labeled STA1. At final EOS tower station 490, labeled STAN power adapter 429 provides power to controller 426, peripheral 461 and switch 595. The main computer monitors input signals from safety input 405, motor ground 445, remote computer 507 as well as input signals from manipulators 412, 413 and 416 and controls output signals on cables 405, 471, 475, 476, 455, and 445. A controller 425 monitors outputs 475 and 476 from main computer 506 and applies power by the use of contactor 482 to provide a drive signal to motor 435. The main computer provides control through the control of switch 411, switch 414 and contactor 402. Manipulator 412 provides a switch input that indicates whether the final EOS tower station 490 should either move or not move. In an embodiment switch 411 provides a signal to an intermediate moveable station such as station 420 to indicate that the station should move or not move. In an embodiment, manipulator 412 is a Single Pole Single Throw (SPST) switch providing high voltage to main computer 415 when the move switch 412 is on, and otherwise providing low voltage to main computer 415. Manipulator 416 provides a deflection indication for percent of the motor rate to be applied at the EOS motor 436. Manipulator 416 is for example a potentiometer that sets up an analog voltage input to main computer 415. The main computer reads the input voltage from the move manipulator 412 and reads the analog level from manipulator 416 through an A/D converter and determines whether or not to provide a move signal to the EOS tower at a selected percentage of motor power. In the event that move is indicated by switch 412, the main computer applies the selected percentage to provide a duty cycle on the move signal output from switch 411 that corresponds to the selected percentage. For example, if the manipulator 416 indicates a 25% duty cycle, the switch 411 is selected to route AC 110 power to contactor computer controller 426 with a 25% time on over a minute. Computer controller 426 then routes AC power out to contactor 483 to provide a 25% activation of motor 436. In an embodiment, the duty cycle is set up over a minute interval. In a variation, switch 411 output is applied directly to contactor 483 so that the system is operational even when computer controller 426 is in a failed state. Manipulator 413 is typically a SPST switch that either provides high voltage level to main computer 415 when the switch is in a forward indication or, alternatively, supplies low voltage to main computer 415 in which case a reverse direction is indicated. Main computer 415 then selects switch 414 to be in the corresponding state either routing AC power to the FWD output 475 or routing AC power to the REV output 476. In an embodiment switch 414 is a Single Pole Double Throw Switch, (SPDT). Main computer 415 monitors safety conditions reported from computers in the system and also monitors a physical shutoff switch at STA0. When main computer 415 determines that conditions are not safe, contactor 402 is forced into an open circuit condition so that main motor supply power is not routed to motor power 455 and motor ground 445. An unsafe safety condition generally refers to a condition entered to prevent damage to the system. Further, the system 400 routes the motor ground 445 through a series of switches at each tower, e.g. switch 466 at the EOS station and switch 465 at the first station. If any station determines a condition that would affect safety, a safety switch is set into the open circuit condition at the station. For example if controller 425 determined that the angle between adjacent spans was at an unsafe angle, switch 465 would be set to open circuit through control 424. Likewise, controller 426 determines an unsafe condition control 494 is selected to put switch 466 in an open-circuit condition. Main computer 415 then senses the continuity between motor ground 445 and safety 405, and if there is no continuity contactor 402 is forced to an open circuit condition. In an embodiment, the open-circuit test is a no-load test which measures the impedance between motor ground 445 and safety 405.

In a variation, discrete move signal cable 471, fwd cable 475, rev cable 476, and safety cable 473 are eliminated and signaling is provided by data communication between main computer 415, controller 425, and controller 426 through data communication of equivalent signals. Parameters are sent from main computer 415 to a controller 20 which receives parameters defining the intended signal, and the parameters are applied through motor interface 30 to provide a drive signal to motor 35.

In an embodiment, cables sufficient for forming cable group 491 and cables sufficient for forming cable group 591 are incorporated into a single cable with one or more discrete control lines to form a composite span cable bus surrounded by an overall insulating sheath. In an embodiment, a span cable bus is a general purpose group of wires suitable for providing a power group, a communication bus and a control line group. In an embodiment, the communication bus comprises cable group 591, comprising one or more cables such as an Ethernet cable 521. In an embodiment, each conductor of cable group 591 is individually sheathed with an insulating material and cable group 591 is sheathed with an overall insulating material. In an embodiment, power group comprises motor power group 455 and motor ground 445. Control line group comprises one or more control lines, e.g. 110 volt lines each individually sheathed in insulating material.

A method and system of operations supporting the communication of data on-machine, the IP-based architecture is disclosed herein. Concerning the span bus, the technical description of included features are as follows:

1. Power lines: Two or more power distribution conductors; typically four as used in 3-phase power distribution but could be more or less.

2. Control lines: one or more depending on the control needs. An example of control line could be 110V control lines for pumps, valves, or other ancillary devices.

3. Communication bus: a digital communication bus will be included within the span bus cable and provide a high-speed data communications backbone across the entire length of the machine. The communication bus can include fiber optics or four pair copper cabling or similar digital communication means.

4. Outer jacket: The power, control and communication lines will be combined into one packaged cable making it easy to install and removes the need to have multiple cables running the length of the machine. The outer jacket also provides the environmental protection based on the application. Additional jackets or wires could be used for shielding, earthing of shield, or other purposes as necessary.

In an embodiment, the number of control conductors is reduced over a conventional control design through the use of the IP-based architecture. This is a competitive advantage since the cost of the cabling is proportional to the number of such conductors.

Exemplary visual characteristics: The span bus cable contains an identification method on the outer jacket including one or more of the following items: a. Part Number, b. Description, c. Number of power lines, d. Number of control lines, e. Communication bus, f. Electrical rating, g. A visually identifiable characteristic such as color symbol, pattern, bar-code etc. h. And similar descriptive methods.

Size: the span bus cable size is proportional to the number of conductors and variable in length based on span sizing. A multitude of sizes and lengths can be figured based on the variety of electrical sizing parameters and span lengths respectively.

IP switches provide connectivity of a computing system, one or many, onto the span bus cabling. The computing system handles all on-machine functions of operation as well as IP protocols may be employed in an IP based architecture. When multiple computing systems are used, they can provide post process data to other addressable computing systems on-machine or off-machine; the transmission of data to other irrigation systems and or networks both wired or wirelessly. With such a computing system, the transformation of machine controls from electromechanical to digital can occur. Machine functions such as alignment, current, temperature, valve actuations, and position sensing and the like, can be combined within the computing system enabling data processing, command and control locally or distributed to other devices on the span bus.

In a maintenance mode, the power to all motors is shut-off by the main computer 506 releasing contactor 402 at STA0 410. In an align mode, the motor power is available to any station because the main computer powers contactor 402, but the motors are moved in a special, and independent way, without operating in a normal run-mode. In an embodiment, a coordinated recovery mode successively manipulates individual motors to attempt automated recovery. For example, the out of alignment stations are moved in small increments, such as 5 seconds, sequentially until each angle is at the correct alignment level. In the situation shown in FIG. 6 for example, the sequence might be STA5, STA4, STA6, STA7, and then repeated. If attempted moves are not completed, the automated recovery terminates and presents a warning message indicating that recovery was not complete.

Parameters received at configuration component 22 include system operation controls, tower operation controls, ancillary/auxiliary settings. System controls include for example a control indicating that the machine is in a shut-down mode, an align mode, or a run-mode, a stop mode, or a general application depth mode, or a selective application mode. A general application depth mode commands the system to put down a certain depth of fluid over the entire covered area. A selective application mode performs selective coverage of areas based on sector. Tower controls include commands to move and align a tower. Ancillary/auxiliary settings include parameters that indicate commands for the control of a swing arm, a valve, and a booster pump, and the like. In an embodiment, peripheral 60 receives a VFD level parameter to control a booster pump to control increasing mainline pressure for sprinkler fluid applications. Parameters are for example an on/off control for a watering valve actuator. A parameter may indicate duty cycle for a watering valve actuator. In an embodiment, parameters received by configuration component 22 control an aspect of a steering function for a swing arm. In an embodiment parameters received by configuration component 22 includes settings for Variable Rate Irrigation (VRI) Relays. In an embodiment, a peripheral 60 is a zone signal processor that controls zone signals to one or more zone controllers. In an embodiment, peripheral 60 is a zone control device and configuration component 22 acts as a zone signal processor that direction controls peripheral 60.

In an embodiment peripheral 60 provides raw data to reporting component 80 from ancillary/auxiliary devices such as swing arms, booster pumps or valves for fluid dynamics and the like. In an embodiment peripheral 60 provides raw data to reporting component 80 that comprises sensory information from sensors on and/or off machine that could be used towards system operation, tower control or ancillary control. In an embodiment, a peripheral 60 receives data through wireless radio or infrared communication from a device that is not located on the machine, such as a ground acidity sensor, salinity sensor, or the like. In an embodiment, raw temperature data is related to temperature of motor, gearboxes, and/or mechanical drivetrain. In an embodiment, raw data includes torque, which is a measure of how much output is provided through the drivetrain.

In an embodiment, a threshold is derived from a window parameter and a location of the window.

In an embodiment, a parameter disclosed herein, e.g. a water valve actuation parameter, received by configuration 22 is applied based on the position of the associated tower within the field. In an embodiment, a command disclosed herein, is applied within the configuration component 22 as a function of the position of the associated tower within the field.

In an embodiment, a computer such as main computer 506 includes an aggregation component that gathers report data from all available reporting modules 50 that are each associated with a tower in the machine. The aggregation component makes a decision whether or not to generate a system alert based on system level policies that are set with the aggregation component. For example, an aggregation component has a policy that safety critical alerts put the machine in a shut-down mode, e.g. when a reporting component 80 reports that a temperature is above a certain level. As another example, a threshold level of tires below a threshold pressure level results in a predictive maintenance alert. The threshold level is settable within the aggregation component. Thresholds may likewise be set on any report data to determine a predictive maintenance, preventative maintenance or safety shutdown to prevent damage to the system if there is a failure on a tower.

An embodiment is directed to a system, method and related used in communicating machine and peripheral data on-board the irrigation system and supporting communication bus. On machine data can be used in a myriad of ways but most importantly, machine control, positioning and safety data is transmitted to and from devices along the machine providing large bandwidth and data transfer at high speeds.

An embodiment performs communication in concert with an existing data communication system as described herein. Data may be collected through electronic or electromechanical devices, microcontrollers and the like and transferred along control lines on span cable. Span cable typically includes an electrical power and communication backbone. Span cable is used to distribute power and controls along the length of the machine. This cable contains multiple conductors distributing either 480V and or 110V power. They are typically contained within the same tube known as a cable jacket. On a typical system only one cable is needed to provide the power and communication distribution backbone. Span cable conductors are typically made of copper or aluminum. These conductors can also be used as a means of communicating data such as in the case of a power line modem data communication system. This type of communication is limited by data size and speed. Modems modulate and demodulate data across these conductors when they are not in-use or no alternating current is present. Span cables come in a variety of sizes. The size of the span cable is proportional to the collective size of all of the conductors and wires combined. The size is selected based on the anticipated loads, in amps, that the irrigation system will consume as well as the number of communication or control cables required to power the peripheral devices attached to this system such as but not limited to end guns. Span cable may include a double-wire ground (green and green/yellow dashed), and wires coded with red, purple, pink, orange, brown, yellow, blue, black and white. In an embodiment other colors are used. In an embodiment other codes are used. In some cases, spans will contain additional devices requiring data communication channels to be present such as an ancillary span and the like. These devices could be global positioning devices or similar sensing devices located on the towers or other parts of the machine. When data communications are required to cover long distances a separate cable is typically installed for this purpose. This is typically a twisted pair of copper wires in a protective jacket that allows for a robust communication scheme such as RS485 to be used between devices. RS485 twisted pair cable may be used for example made of stranded wire with two insulation-sheathed twisted pair signal wires an unsheathed stranded earthing wire a foil shield and an outer insulating sheath. The primary purpose of the span cable is to provide power to the drivetrain powering the system. Control wires within the same cable provide control signals to propel the machine in forward movement through one control signal and reverse movement on another. The two control lines are never signaling at the same time. Since only one is in use at a time, this provides an available cold wire, the term used when a control wire is not energized with high voltage or alternating current is not present, where data can be transmitted through the use of the power line modem technology. For example, a base 502 might be fitted with a modem and communicatively coupled for communication to a modem at rover/ancillary span 596 through dual RS-485 twisted pair. Power line modems switch from one control wire to another, whichever one is cold, to provide communications up and down the machines infrastructure or wherever the copper conductors are located. The data is modulated along the copper wire at various frequencies and on set channels. There are four channels that are in use at any given time to provide redundant and more secure communications in the event interference from nearby electronics distort the signaling process. Frequencies can also be changed to prevent cross talking from other nearby machines. The data is sent and received through these modems and then passed on to a microcontroller or system on module for further processing, storage, analysis and ultimately purposed to drive machine logic during normal operation cycles. Power line communication might take place for example through a pink wire for reverse and a purple wire for forward communication. In an embodiment, a microcontroller is used to interface the sensing devices such as GPS receivers or pressure transducers through the use of the power line modem (PLM). The microcontroller also provides the addressing required to route the data to the correct location for use. On a machine, there can be multiple power line modems, in use to collect data from a multitude of devices and signals. PLMs talk over powerline directly to a VRI endpoint and also to serial computer devices at either end of a powerline, and to analog sensors at the endpoints.

An embodiment uses a method to communicate data on-machine. This is done using Ethernet protocols and over an Internet Protocol (IP) based architecture; the method in which devices will be addressed and data will be packaged for transmission and routing on-machine. With this method, the span cable has changed into a multi-purpose cable not only providing the power distribution but also communication wires to support the data transmissions. This will employ dedicated communication channels or conductors in lieu of switching between cold wires. In an embodiment, this replaces power line communication technology. Power line communication can still be utilized on the machine in addition to the new scheme where a duality of communication methods may be in use at one time. This use case is used for retro-fit applications where new IP-based devices and span bus are added to a system containing the legacy power line technology.

Methods employed include one or more of the following:

1) inclusion of a digital communication bus adjacent to power and control distribution lines within a common jacket: Combines all of the necessary power, control and data lines into one single cable.

2) Communication bus backbone: The use of a digital communication IP-based architecture on-machine.

3) The use of Ethernet protocol: The use of Ethernet protocols as the backbone for which IP-based data will be communicated.

4) Switching interface: The use of switching to interface the IP-based architecture.

5) Plurality of computing systems: The use of a plurality of computing systems wherever data collection is required.

6) Tower controls over IP: The use of IP to transmit and receive tower controls and the like along the irrigation system which includes Ethernet based contactors, alignment, current, temperature, torque, position and the like.

7) Tower controls over IP: Tower alignment through the use of independently addressable IP-based control to propel a tower in order to maintain expected course of travel in comparison to other adjacent towers.

8) Tower controls over IP: Local exception based error handling on tower through algorithmic methods which may include but are not limited to utilizing current draw, oil temperature, tire pressure and/or alignment.

9) Peripheral controls over IP: The use of IP to transmit and receive peripheral controls along the irrigation system which includes variable frequency drives, actuators, telematics, environmental sensors, cameras and the like.

In an embodiment, controller 20 and sensor 40 are mounted within a control box at the first tower and communicatively coupled through interface 41.

In an embodiment sensor 40 includes one or more screws that allow a manual adjustment of the angle sensed by sensor 40. In a variation on system 100, motor power and ground cable group 69 are routed into controller 20, and then into contactor 82.

Exemplary system 20 comprises one or more processors operable to receive instructions and process them accordingly. A computing device may be embodied as a single computing device or multiple computing devices communicatively coupled to each other. In one embodiment, processing actions performed by system 20 are distributed among multiple locations such as a local client and one or more remote servers. In one embodiment, system 20 comprises one or more computing devices 506, 507, 527, 537, 547, 557, 567, 597, 88, 415, 425, 426, 502, 596, 546 such as a server, desktop computer, laptop, or tablet, cloud-computing device or distributed computing architecture, a portable computing device such as a laptop, a flat-screen, controller, microcontroller, embedded system, positioning computer, tablet, ultra-mobile P.C., or a mobile phone.

Figure 7:
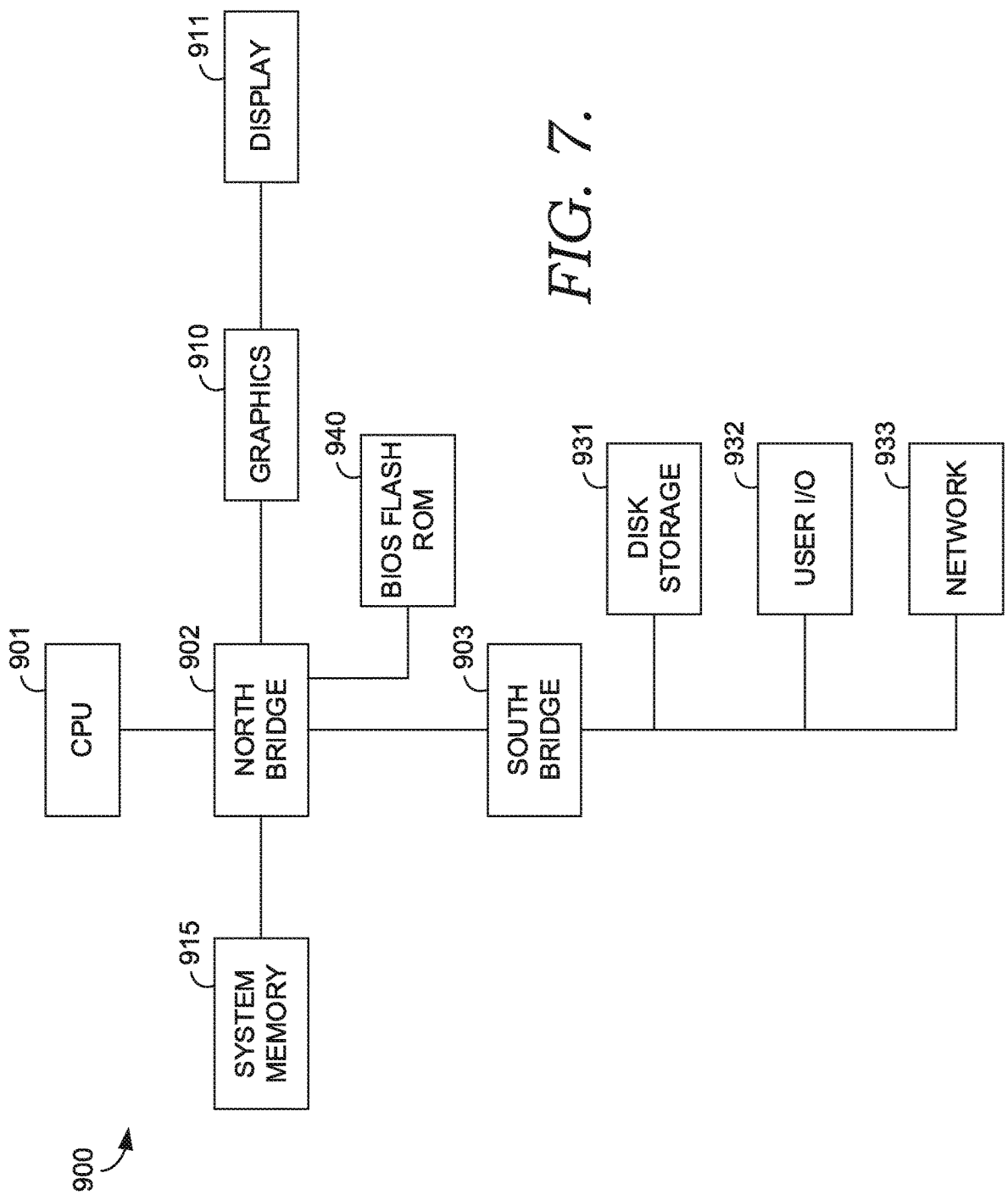
FIG. 7 depicts an embodiment of an illustrative computer operating environment suitable for practicing embodiments of the present disclosure.

Turning briefly to FIG. 7, there is shown one example embodiment of computing system 900 that has software instructions for storage of data and programs in computer-readable media. Computing system 900 is representative of a system architecture that is suitable for computer systems such as computing system 20, 506, 507, 527, 537, 547, 557, 567, 597, 88, 415, 425, 426, 502, 596, or 546. One or more CPUs such as 901, have internal memory for storage and couple to the north bridge device 902, allowing CPU 901 to store instructions and data elements in system memory 915, or memory associated with graphics card 910, which is coupled to display 911. Bios flash ROM 940 couples to north bridge device 902. South bridge device 903 connects to north bridge device 902 allowing CPU 901 to store instructions and data elements in disk storage 931 such as a fixed disk or USB disk, or to make use of network 933 for remote storage. User I/O device 932 such as a communication device, a mouse, a touch screen, a joystick, a touch stick, a trackball, or keyboard, couples to CPU 901 through south bridge 903 as well. The system architecture depicted in FIG. 7 is provided as one example of any number of computer architectures, such as computing architectures that support local, distributed, or cloud-based software platforms, and are suitable for supporting computing system 500. User I/O device 932 in an embodiment is a signal switch, a microswitch, a contactor, a power signal relay, an AC relay, A 3-phase relay, a gang relay, an analog out, an analog input, a digital input a digital output, a UART input, a UART output, a serial bus, a parallel bus, USB, Fire-wire, a Blue-tooth interface. In an embodiment, system 900 is implemented as a microsequencer without an ALU. In an embodiment system 900 is implemented as discrete logic that performs the functional equivalent in discrete logic such as a custom controller, a custom chip, Programmable Array Logic (PAL), a Programmable Logic Device (PLD), an Erasable Programmable Logic Device (EPLD), a Field-Programmable Gate Array (FPGA) a macrocell array, a complex programmable logic device, or a hybrid circuit.

In some embodiments, computing system 900 is a computing system made up of one or more computing devices. In an embodiment, computing system 900 includes an adaptive multi-agent operating system, as described above, but it will be appreciated that computing system 900 may also take the form of an adaptive single agent system or a non-agent system. Computing system 900 may be a distributed computing system, a data processing system, a centralized computing system, a single computer such as a desktop or laptop computer or a networked computing system.

Many different arrangements of the various components depicted, as well as components not shown, are possible without departing from the scope of the claims below. Implementations of the disclosure have been described with the intent to be illustrative rather than restrictive. Alternative implementations will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

For example, in conjunction with specificity requirements and for clarity, the algorithm for angle threshold modification generally described in conjunction with FIG. 2 was described at times addressing a forward run motion with a reference angle that is well above 180 degrees when tower motion begins. Other directions and other angle references are analogously understood from the conventions described. The description enclosed herein enables other directions and other reference angles, as fully enabled by the enclosed description. Operation of such modifications to conventions are anticipated and within scope of claims because they work analogously to what is described herein, although the detailed implementation may differ cosmetically from the detailed disclosure which is included to enable detailed implementations.

Additionally, a positioning system was generally disclosed in the context of a GPS positioning system. In an embodiment a Global Navigation Satellite System (GLASS) positioning system or other similar positioning system is used instead.

Further, while aspects of the present invention were discussed as applied to intermediate towers of a center pivot irrigation system, the present invention is not so limited. Aspects of the present invention could be equally applied to movable towers in a lateral move irrigation system to keep the towers in alignment as the lateral irrigation system moves across the ground. Similarly, aspects of the present invention may also be used in the coordination of movement of various objects of a system in alignment outside of the irrigation context. Such use is within the scope of the present invention and contemplated by the following claims.

The invention claimed is:

1. A network system providing enhanced operation for an electrically controlled irrigation system comprising:
a first network switch located on a first tower of the electrically controlled irrigation system;
a second network switch located on a second tower of the electrically controlled irrigation system;
a final network switch located on a final tower of the electrically controlled irrigation system, wherein the second tower located is further from a center pivot of the irrigation system than the first tower and closer to the pivot than the final tower;
wherein the first network switch and the second network switch are configured to forward packets received from the pivot side of the electrically controlled irrigation system towards the final tower that is furthest from the center pivot and wherein the first network switch and the second network switch are configured to forward packets received from the final tower side of the electrically controlled irrigation system towards the center pivot side of the electrically controlled irrigation system;
a main computer for the irrigation system; and
a controller located at the second tower, wherein the controller is coupled to the second network switch, and wherein the controller is configured to control operations of the second tower in response to one or more parameters sent in a network addressed communication from the main computer, relayed by the first network switch, and received by the second network switch, wherein the second network switch learns a network address of the controller and forwards the one or more parameters destined for the controller to the controller.

2. The network system of claim 1, wherein the one or more parameters comprises an indication of a different mode of operation for aligning the second tower in the irrigation system.

3. The network system of claim 2, wherein the one or more parameters comprises an indication of a threshold modification.

4. The network system of claim 3, wherein the controller is further configured to provide a first value for a threshold level when positioning information satisfies a first condition, but provide a second value for a threshold level when the positioning information does not satisfy the first condition.

5. The network system of claim 1, wherein the controller is further configured to send, via the second network switch, first report data comprising at least one of tire pressure, current, temperature, torque, position, image, current angle, exception based error information, information used for predictive maintenance, information used for preventative maintenance, information that a safety shutdown is required to prevent damage to the system, oil temperature, water pressure, valve state, valve rate, environmental sensor, VFD level, drive direction and infra-red data.

6. The network system of claim 1, wherein the controller is further configured to receive report data, and display one or more of a predictive maintenance alert status, a preventative maintenance status, and a safety shut-down status.

7. The network system of claim 1, wherein the controller is further configured to send, via the second network switch, second report data related to comparing one or more of tire pressure, current, temperature, torque, position, image, current angle, exception based error information, oil temperature, water pressure, valve state, valve rate, environmental sensor, VFD level, drive direction and infra-red data to one or more thresholds.

8. A method for routing communications through an irrigation system comprising an irrigation conduit originating at a center pivot, supported by a plurality of towers, and terminating proximate to a final tower that is furthest from the center pivot, the method comprising:

outputting for display a user interface for showing a current status of a tower in the plurality of towers;
receiving, through the user interface, a control instruction for the tower;
outputting, from a first network switch located proximate to the center pivot, a message into a network cable connecting the first network switch to a second network switch located proximate to a first tower, the message including one or more parameters associated with the control instruction, wherein the message is addressed according to an internet protocol;
receiving the message at the second network switch;
determining, at the second network switch, that the message was received from the first network switch located at the center pivot;
determining, at the second network switch, that the message should be forwarded to a third network switch located on a tower between the first tower and the final tower that is furthest from the center pivot because the message was received from the center pivot;
communicating the message from the second network switch to the third network switch, wherein the third network switch learns a network address of a controller co-located on the same tower with the third network switch and forwards the one or more parameters destined for the controller to the controller, wherein the controller is configured to control operations of the co-located tower in response to the one or more parameters received.

9. The method of claim 8, wherein the one or more parameters comprises an indication of a different mode of operation for aligning a moveable tower in an irrigation system.

10. The method of claim 8, wherein the one or more parameters comprises an indication of a threshold modification.

11. The method of claim 10, further comprising providing positioning information to the first network switch, and providing a first value for a threshold level when the positioning information satisfies a first condition or a second value for the threshold level when the positioning information does not satisfy the first condition.

12. The method of claim 8, further comprising reporting, via the second network switch, first report data comprising at least one of tire pressure, current, temperature, torque, position, image, current angle, exception based error information, information used for predictive maintenance, information used for preventative maintenance, information that a safety shutdown is required to prevent damage to the system, oil temperature, water pressure, valve state, valve rate, environmental sensor, VFD level, drive direction and infra-red data.

13. The method of claim 8, further comprising receiving report data and displaying one or more of a predictive maintenance alert status, a preventative maintenance status, and a safety shut-down status.

14. The method of claim 8, further comprising reporting, via the second network switch, second report data related to comparing one or more of tire pressure, current, temperature, torque, position, image, current angle, exception based error information, oil temperature, water pressure, valve state, valve rate, environmental sensor, VFD level, drive direction and infra-red data to one or more thresholds.

15. One or more computer hardware devices having computer-executable instructions embodied thereon that, when executed, facilitate a method of controlling operation of an irrigation system, the method comprising:
outputting, from a first network switch located proximate to the center pivot, a message into a network cable connecting the first network switch to a second network switch located proximate to a first tower, the message including one or more control parameters associated for a second tower, wherein the message is addressed according to an internet protocol;
receiving the message at the second network switch at the first tower;
determining, at the second network switch, that the message was received from the first network switch located at the center pivot;
determining, at the second network switch, that the message should be forwarded to a third network switch located on a tower between the first tower and the final tower that is furthest from the center pivot because the message was received from the center pivot;
communicating the message from the second network switch to a third network switch on the second tower;
receiving, by a computing device associated with the second tower and from the third network switch, the one or more parameters that indicate a different mode of operation for aligning a moveable tower in the irrigation system, wherein the third network switch learns a network address of the computing device and forwards the one or more parameters destined for the computing device to the computing device; and
activating a motor on the second tower to provide drive force based on the one or more parameters.

16. The one or more computer hardware devices of claim 15, further comprising providing a first value for a threshold level when positioning information satisfies a first condition, and providing a second value for a threshold level when the positioning information does not satisfy the first condition.

17. The one or more computer hardware devices of claim 15, further comprising receiving via an internet protocol a drive indication.

18. The one or more computer hardware devices of claim 15, further comprising sending via an internet protocol first report data comprising at least one of tire pressure, current, temperature, torque, position, image, current angle, exception based error information, information used for predictive maintenance, information used for preventative maintenance, information that a safety shutdown is required to prevent damage to the system, oil temperature, water pressure, valve state, valve rate, environmental sensor, VFD level, drive direction and infra-red data.

19. The one or more computer hardware devices of claim 15, further comprising sending to a computer via an internet protocol information including one or more of a predictive maintenance alert status, a preventative maintenance status, and a safety shut-down status for display to a user of the computer.

20. The one or more computer hardware devices of claim 15 further comprising sending, via the second network switch, second report data related to comparing one or more of tire pressure, current, temperature, torque, position, image, current angle, exception based error information, oil temperature, water pressure, valve state, valve rate, environmental sensor, VFD level, drive direction and infra-red data to one or more thresholds.

* * * * *